United States Patent
Dabbs et al.

(10) Patent No.: US 9,810,088 B2
(45) Date of Patent: Nov. 7, 2017

(54) FLOATING BLADE OUTER AIR SEAL ASSEMBLY FOR GAS TURBINE ENGINE

(71) Applicant: UNITED TECHNOLOGIES CORPORATION, Hartford, CT (US)

(72) Inventors: Thurman C Dabbs, Dover, NH (US); James N Knapp, Sanford, ME (US)

(73) Assignee: United Technologies Corporation, Farmington, CT (US)

( * ) Notice: Subject to any disclaimer, the term of this patent is extended or adjusted under 35 U.S.C. 154(b) by 233 days.

(21) Appl. No.: 14/775,981

(22) PCT Filed: Mar. 14, 2014

(86) PCT No.: PCT/US2014/028123
§ 371 (c)(1),
(2) Date: Sep. 14, 2015

(87) PCT Pub. No.: WO2014/143934
PCT Pub. Date: Sep. 18, 2014

(65) Prior Publication Data
US 2016/0024956 A1   Jan. 28, 2016

Related U.S. Application Data

(60) Provisional application No. 61/788,819, filed on Mar. 15, 2013.

(51) Int. Cl.
*F01D 11/22* (2006.01)
*F01D 5/20* (2006.01)
*F02C 7/28* (2006.01)

(52) U.S. Cl.
CPC ............. *F01D 11/22* (2013.01); *Y02T 50/671* (2013.01)

(58) Field of Classification Search
CPC ............................... F01D 11/22; Y02T 50/671
See application file for complete search history.

(56) References Cited

U.S. PATENT DOCUMENTS

| | | | | | |
|---|---|---|---|---|---|
| 4,230,436 | A | * | 10/1980 | Davison | F01D 11/24 415/1 |
| 5,018,942 | A | * | 5/1991 | Ciokajlo | F01D 11/22 415/127 |
| 5,035,573 | A | * | 7/1991 | Tseng | F01D 11/22 415/126 |
| 5,049,033 | A | * | 9/1991 | Corsmeier | F01D 11/22 415/127 |
| 5,056,988 | A | * | 10/1991 | Corsmeier | F01D 11/22 415/126 |
| 5,104,287 | A | * | 4/1992 | Ciokajlo | F01D 11/22 415/126 |
| 8,814,507 | B1 | * | 8/2014 | Campbell | F01D 5/08 415/139 |
| 2007/0020095 | A1 | | 1/2007 | Dierksmeier et al. | |
| 2009/0266082 | A1 | * | 10/2009 | O'Leary | F01D 11/22 60/785 |
| 2010/0209231 | A1 | | 8/2010 | Lewis | |

* cited by examiner

*Primary Examiner* — Igor Kershteyn
(74) *Attorney, Agent, or Firm* — Bachman & LaPointe, P.C.

(57) ABSTRACT

A blade outer air seal (BOAS) assembly for an engine case of a gas turbine engine includes a multiple of supported air seal segments and a multiple of floating air seal segments circumferentially alternate with the multiple of supported air seal segments.

18 Claims, 5 Drawing Sheets

FLOATING BLADE OUTER AIR SEAL ASSEMBLY FOR GAS TURBINE ENGINE

This application claims priority to U.S. patent application Ser. No. 61/788,819 filed Mar. 15, 2013.

BACKGROUND

The present disclosure relates to a gas turbine engine and, more particularly, to a blade outer air seal therefor.

Gas turbine engines, such as those that power modern commercial and military aircraft, generally include a compressor to pressurize an airflow, a combustor to burn a hydrocarbon fuel in the presence of the pressurized air, and a turbine to extract energy from the resultant combustion gases. The compressor and turbine sections include rotatable blade and stationary vane arrays. Within an engine case structure, the radial outermost tips of each blade array are positioned in close proximity to a shroud assembly. Blade Outer Air Seals (BOAS) supported by the shroud assembly are located adjacent to the blade tips such that a radial tip clearance is defined therebetween.

When in operation, the thermal environment in the engine varies and may cause thermal expansion and contraction such that the radial tip clearance varies. The radial tip clearance is typically designed so that the blade tips do not rub against the BOAS under high power operations when the blade disk and blades expand as a result of thermal expansion and centrifugal loads. When engine power is reduced, the radial tip clearance increases. To facilitate engine performance, it is operationally advantageous to maintain a close radial tip clearance through the various engine operational conditions.

The assemblies are often segmented to accommodate the thermal gradients and permit expansion and contraction. The segmented interface, however, provides a potential cooling air leakage path that is often sealed with feather seals that may be prone to leakage and wear. Feather seals are also subjected to temperature limitations that may be lower than the Blade Outer Air Seal segments.

SUMMARY

According to an aspect of the present invention, a BOAS assembly for an engine case of a gas turbine engine is provided. The BOAS assembly includes a multiple of supported air seal segments, and a multiple of floating air seal segments that circumferentially alternated with the multiple of supported air seal segments.

According to another aspect of the present invention, a gas turbine engine is provided that includes an engine case structure, a shroud assembly, a multiple of supported air seal segments, and a multiple of floating air seal segments. The engine case structure extends around an engine central longitudinal axis. The shroud assembly is attached to the engine case structure. The multiple of supported air seal segments are attached to the shroud assembly. The multiple of floating air seal segments circumferentially alternated with the multiple of supported air seal segments.

According to another aspect of the present invention, a method for blade tip clearance control of a gas turbine engine is provided. The method includes the step of circumferentially alternating a multiple of floating air seal segments with a multiple of supported air seal segments.

Additionally or alternatively, the present invention may include one or more of the following features individually or in combination:

each of the multiple of floating air seal segments includes a first stepped surface with a first contact surface, and a second stepped surface with a second contact surface;

the first contact surface and the second contact surface each include a semi-cylindrical member;

the first contact surface and the second contact surface each are axially arranged with respect to an engine central longitudinal axis;

the first contact surface is axially arranged along a length of a first axial edge, and the second contact surface is axially arranged along a length of a second axial edge;

the first stepped surface and the second stepped surface are stepped with respect to a back surface of the multiple of supported air seal segments such that the gas path surface is circumferentially aligned with a gas path surface of the multiple supported air seal segments;

each of the multiple of supported air seal segments includes a support that extends therefrom;

each of the multiple of supported air seal segments includes a support that extends therefrom, and wherein the support interfaces with a shroud assembly;

each of the multiple of supported air seal segments include a support that extends therefrom, and wherein the support movable in response to an actuator;

each of the multiple of floating air seal segments includes a support that extends therefrom, and wherein the support interfaces with a shroud assembly;

the multiple of supported air seal segments are actively actuated;

the method further comprises supporting the multiple of supported air seal segments with respect to a shroud assembly; and the method further comprises constraining the multiple of floating air seal segments with respect to the shroud assembly.

The foregoing features and elements may be combined in various combinations without exclusivity, unless expressly indicated otherwise. These features and elements as well as the operation of the invention will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
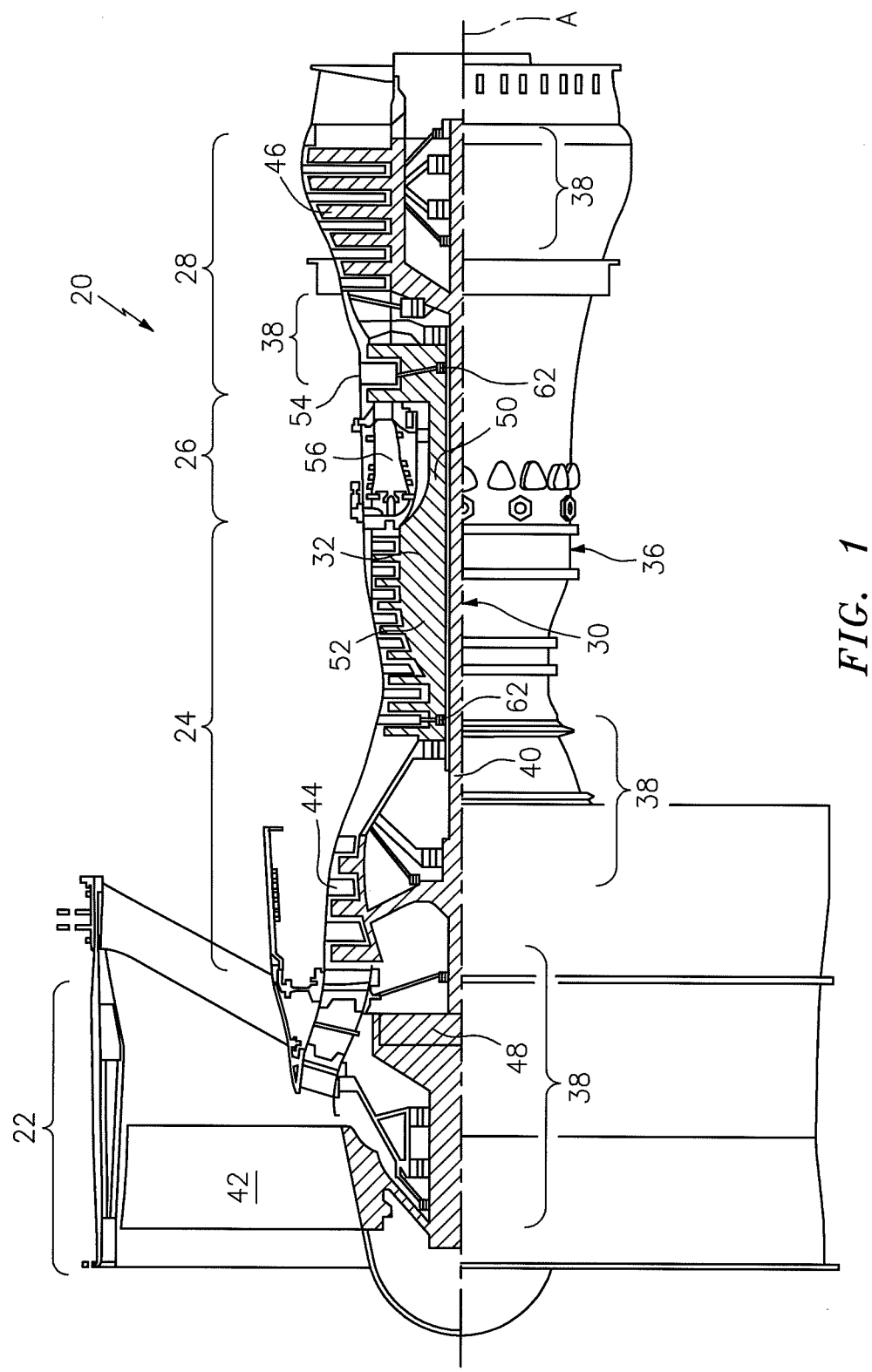
FIG. 1 is a schematic cross-section of one example aero gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines might include an augmentor section (not shown), among other systems or features.

The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be appreciated that the concepts described herein are not limited to use with turbofans. The present teachings may be applied to other types of turbine engines (e.g., turbojets, turboshafts, industrial gas turbines, and three spool (plus fan) turbofans) wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine case structure 36 via several bearing structures 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. An exemplary geared architecture 48 is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44, then the HPC 52, then is mixed with the fuel and burned in the combustor 56, and then is expanded over the HPT 54 and the LPT 46. The HPT 54 and the LPT 46 rotationally drive the respective low spool 30 and high spool 32 in response to the expansion. The inner shaft 40 and the outer shaft 50 are supported at a plurality of points by bearing structures 38 within the static engine case structure 36. It should be appreciated that various bearing structures 38 at various locations may alternatively or additionally be provided.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The gas turbine engine 20 enables operation of the low spool 30 at higher speeds, which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be appreciated, however, that the above parameters are only exemplary of one embodiment of a geared architecture engine and that the present disclosure is applicable to other gas turbine engines, including direct drive turbofans.

In one embodiment, a significant amount of thrust is provided by the bypass flow path due to the high bypass ratio. The fan section 22 of the gas turbine engine 20 is designed for a particular flight condition (e.g., cruise speed of about 0.8 Mach and elevation of about 35,000 feet). This flight condition, with the gas turbine engine 20 at its best fuel consumption, is also known as bucket cruise Thrust Specific Fuel Consumption (TSFC). TSFC is an industry standard parameter of fuel consumption per unit of thrust.

Figure 2:
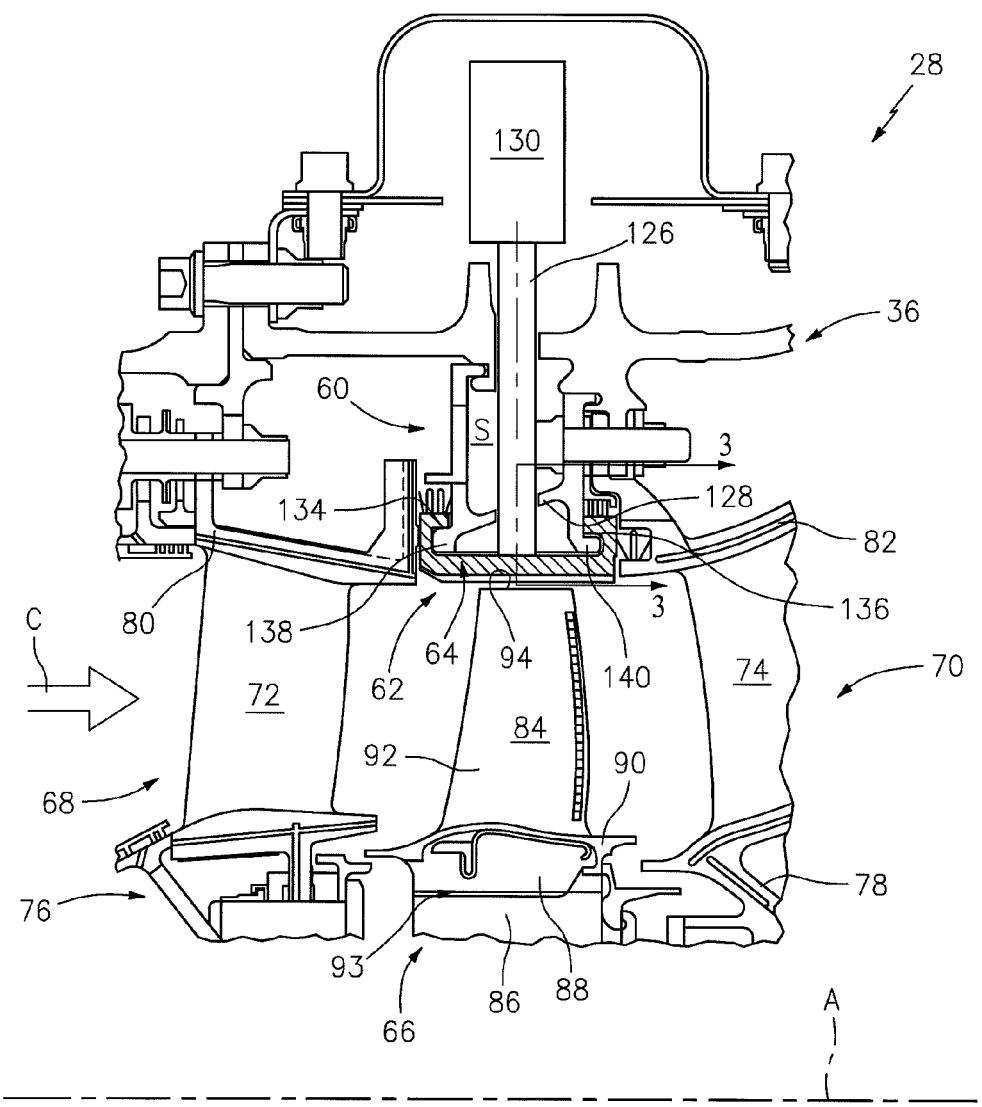
FIG. 2 is an is an enlarged schematic cross-section of an engine section with a BOAS assembly taken along line 2-2 in FIG. 3.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction. The Low Corrected Fan Tip Speed according to one non-limiting embodiment of the example gas turbine engine 20 is less than about 1150 fps (351 m/s). With reference to FIG. 2, an enlarged schematic view of a portion of the turbine section 28 is shown by way of example; however, other engine sections will also benefit herefrom. A full ring shroud assembly 60 within the engine case structure 36 supports a BOAS assembly 62 with a multiple of BOAS segments 64 proximate to a turbine blade rotor assembly 66 (one schematically shown).

The full ring shroud assembly 60 and the BOAS assembly 62 are axially disposed between a forward stationary vane ring 68 and an aft stationary vane ring 70. Each vane ring 68, 70 includes an array of vanes 72, 74 that extend between a respective inner vane support 76, 78 and an outer vane support 80, 82. The outer vane supports 80, 82 are attached to the engine case structure 36.

The rotor assembly 66 includes an array of blades 84 circumferentially disposed around a disk 86. Each blade 84 includes a root 88, a platform 90 and an airfoil 92. The blade roots 88 are received within a rim 93 of the disk 86 and the airfoils 92 extend radially outward such that a tip 94 of each airfoil 92 is closest to the tip of the BOAS assembly 62. Each BOAS segment 64 may be manufactured of an abradable material to accommodate potential interaction with the rotating blade tips 94.

Combustion gases (indicated schematically by arrow C) produced in the combustor section 26 (see FIG. 1), expand in the turbine section 28 and produce pressure gradients, temperature gradients and vibrations. The BOAS segments 64 are supported with respect to the full ring shroud assembly 60 to provide for relative movement to accommodate the expansion caused by changes in pressure, temperature, and vibrations encountered during operation of the gas turbine engine 20. Alternatively, the BOAS segments 64 are actively actuated to control a blade tip clearance.

Figure 3:
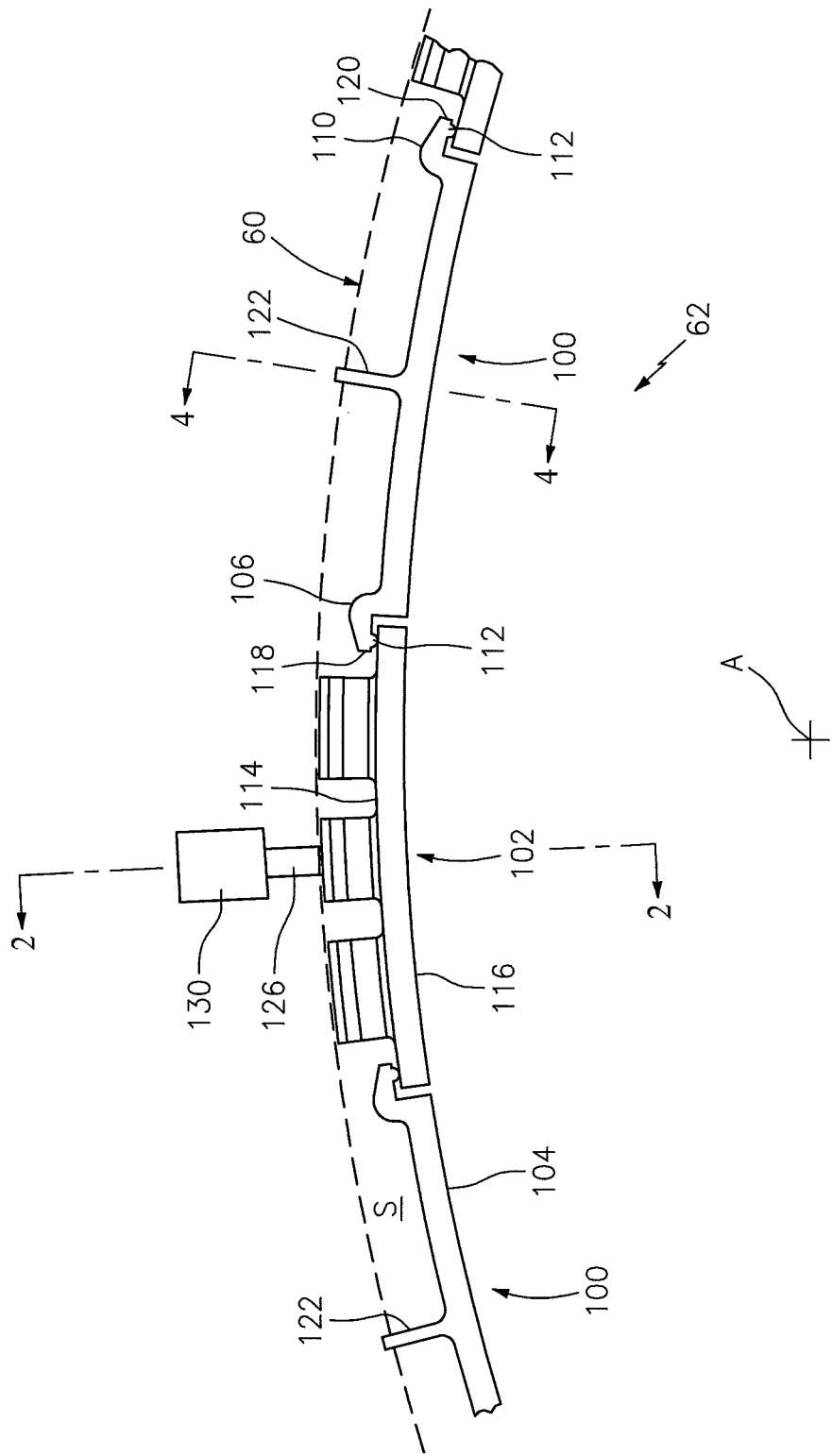
FIG. 3 is a lateral cross-section of the engine section with the BOAS assembly.

With reference to FIG. 3, the multiple of BOAS segments 64 include a multiple of circumferentially alternatively floating air seal segments 100 and supported air seal segments 102. Each of the multiple of floating air seal segments 100 in one disclosed non-limiting embodiment include a gas path surface 104, a first stepped surface 106 with a first contact surface 108, and a second stepped surface 110 with a second contact surface 112. The first stepped surface 106 and the second stepped surface 110 are stepped with respect to a back surface 114 of the supported air seal segments 102 such that the gas path surface 104 is circumferentially aligned with a gas path surface 116 of the supported air seal segments 102.

The first contact surface 108 and the second contact surface 112 are located adjacent to respective first and second axial edges 118, 120, and may be semi-circular in cross-section to maintain contact with the adjacent supported air seal segments 102 as the multiple of BOAS segments 64 flatten out during engine operations. Furthermore, other cross-sectional shapes such as triangular, knife edge, or other shapes may alternatively be utilized for the first contact surface 108 and the second contact surface 112

The first contact surface 108 and the second contact surface 112 may be manufactured of a nickel alloy, cobalt alloy, or other material which is either the same or different than the remainder of the floating air seal segments 100. For example, a cobalt alloy is relatively more lubricious than a nickel alloy and may provide a beneficial contact interface.

Figure 4:
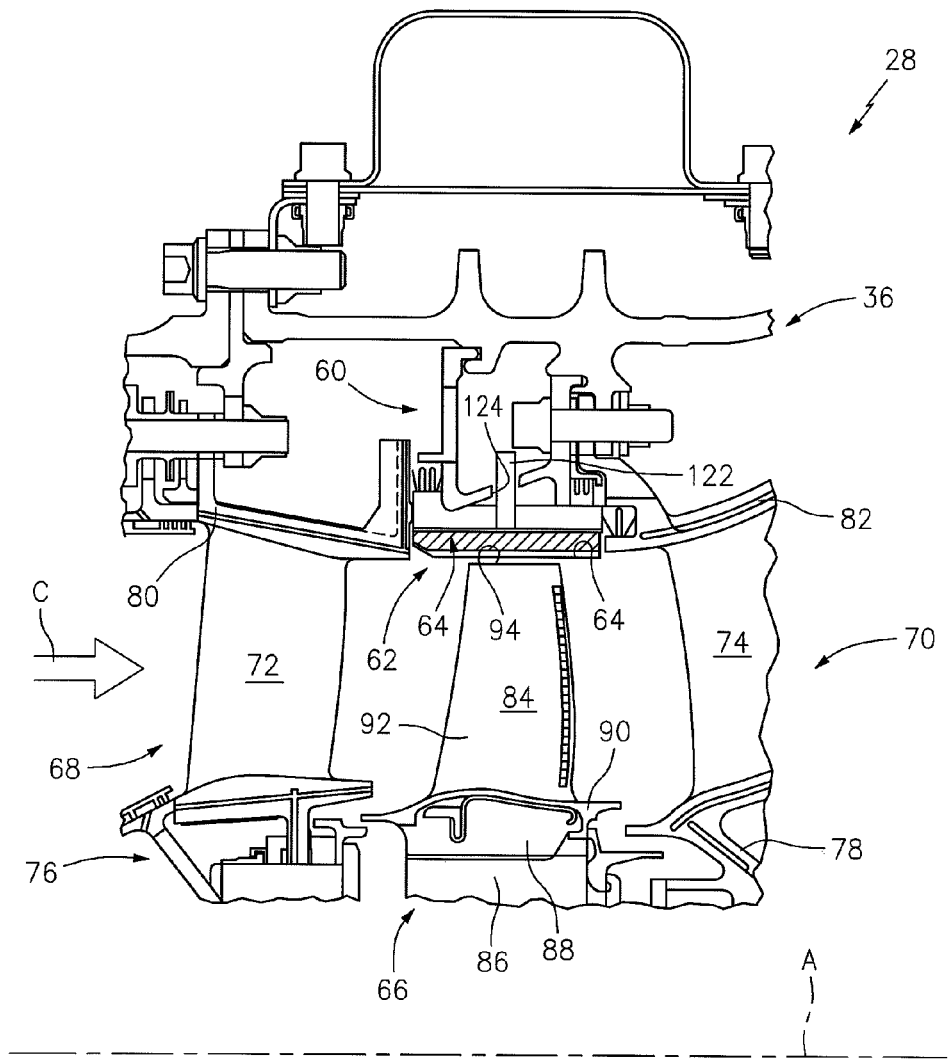
FIG. 4 is an enlarged schematic cross-section of an engine section with a BOAS assembly taken along line 4-4 in FIG. 3.

Each of the multiple of floating air seal segments 100 receive a pressure load from, for example, a secondary airflow (illustrated schematically at S) which maintains the first contact surface 108 and the second contact surface 112 in contact with its adjacent supported air seal segments 102 irrespective of radial distortions of the multiple of BOAS segments 64. This allows the intersegment gaps to be sealed by the pressure loading on the first contact surface 108 and the second contact surface 112 of the floating air seal segments 100 themselves by, for example, an often typical 500 pound (approximately 227 kilograms) differential force between the working gases C and the secondary airflow S. Furthermore, as the interface with the supported air seal segments 102 supports the floating air seal segments 100, significant space is provided between the floating air seal segments 100 and the full ring shroud assembly 60 (see FIG. 4).

In one disclosed non-limiting embodiment, each of the multiple of floating air seal segments 100 includes a support 122. The support 122 may be a post that interfaces with a corresponding aperture 124 in the full ring shroud assembly 60 to constrain movement with respect thereto (see FIG. 4). The aperture 124 constrains axial and circumferential movement, but may permit a predetermined radial "float." The aperture may alternatively be a slot or other shape that does not directly correspond to the support 122 to permit other degrees of freedom. Each of the supported air seal segments 102 includes a radially extending forward hook 134, and an aft hook 136 that respectively cooperates with a forward hook 138 and an aft hook 140 of the full ring shroud assembly 60 (see FIG. 2). The hooks may be segmented or otherwise configured for assembly of the corresponding respective BOAS segment 64 thereto. It should be appreciated that various arrangements may be provided.

In one disclosed non-limiting embodiment, each of the supported air seal segments 102 includes a link 126 attached to an actuator 130 that operates in response to a control 132 of a blade tip clearance control system 134. The control 132 generally includes a control module that executes seal movement logic. The control module typically includes a processor, a memory, and an interface. The processor may be any type of known microprocessor having desired performance characteristics. The memory may be any computer readable medium which stores data and control algorithms such as logic as described herein. The interface facilitates communication with other components such as a thermocouple, and the actuator 130.

The functions of the logic are disclosed in terms of functional block diagrams, and it should be understood by those skilled in the art with the benefit of this disclosure that these functions may be enacted in either dedicated hardware circuitry or programmed software routines capable of execution in a microprocessor based electronics control embodiment. In one non-limiting embodiment, the control module may be a portion of a flight control computer, a portion of a Full Authority Digital Engine Control (FADEC), a stand-alone unit or other system.

Figure 5:
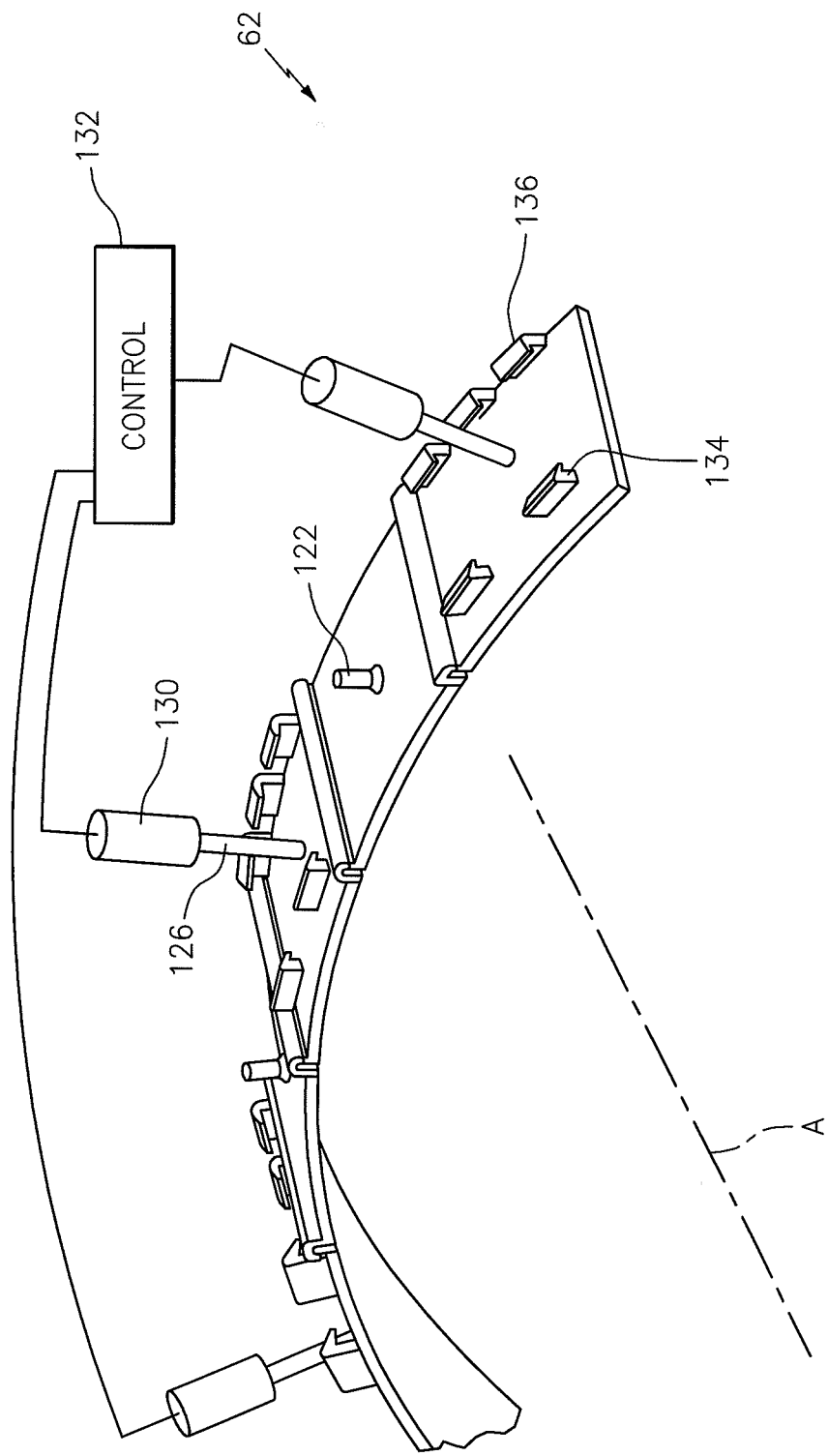
FIG. 5 is a perspective view of the BOAS assembly.

The link 126 may be a portion of, or extend from the actuator 130 so as to contract and expand the multiple of BOAS segments 64 between an extended radially contracted BOAS position and a retracted radially expanded BOAS position. The actuator 130 may include a mechanical, electrical and/or pneumatic drives located, for example, within or external to the ring shroud assembly 60 and/or the engine case structure 36. Whereas the multiple of floating air seal segments 100 interface with the adjacent supported air seal segments 102 that include the link 126, the required number of actuators 130 is halved thereby facilitating a less complicated and lighter weight actuation system (see FIG. 5).

In operation, the actuator 130 provides about 1200-1400 pounds (approximately 544-635 kilograms) of force to provide a radial displacement capability for the array of BOAS segments 64 of about 40 thousandths of an inch (approximate 1 millimeter) in one disclosed non-limiting embodiment. The radial displacement may, at least partially, be a function of the engine core size and the dynamic conditions of the particular engine architecture. Furthermore, the actuator 130 need only "pull" each supported air seal segments 102 as a differential pressure from the core airflow biases the BOAS segment 64 toward the radially contracted position. For example, the differential pressure may exert an about 1000 pounds (approximately 454 kilograms) inward force on each BOAS segment 64.

The BOAS assembly 62 provides thermal and aerodynamic isolation from the interior of the gas turbine engine 20; reduces leakage; increases temperature capability; forms additional space adjacent to the multiple of BOAS segments 64 for cooling, instrumentation, etc.; is fully scalable; and facilitates the usage of numerous actuator systems.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A blade outer air seal (BOAS) assembly for an engine case of a gas turbine engine, comprising:
   a multiple of supported air seal segments; and
   a multiple of floating air seal segments that circumferentially alternated with the multiple of supported air seal segments.

2. The assembly as recited in claim 1, wherein each of the multiple of floating air seal segments includes a first stepped surface with a first contact surface, and a second stepped surface with a second contact surface.

3. The assembly as recited in claim 2, wherein the first contact surface and the second contact surface each include a semi-cylindrical member.

4. The assembly as recited in claim 2, wherein the first contact surface and the second contact surface each are axially arranged with respect to an engine central longitudinal axis.

5. The assembly as recited in claim 2, wherein the first contact surface is axially arranged along a length of a first axial edge, and the second contact surface is axially arranged along a length of a second axial edge.

6. The assembly as recited in claim 2, wherein the first stepped surface and the second stepped surface are stepped with respect to a back surface of the multiple of supported air seal segments such that the gas path surface is circumferentially aligned with a gas path surface of the multiple supported air seal segments.

7. The assembly as recited in claim 1, wherein each of the multiple of supported air seal segments includes a support that extends therefrom.

8. The assembly as recited in claim 1, wherein each of the multiple of supported air seal segments includes a support that extends therefrom, and wherein the support interfaces with a shroud assembly.

9. The assembly as recited in claim 1, wherein each of the multiple of supported air seal segments include a support that extends therefrom, and wherein the support movable in response to an actuator.

10. The assembly as recited in claim 1, wherein each of the multiple of floating air seal segments includes a support that extends therefrom, and wherein the support interfaces with a shroud assembly.

11. A gas turbine engine, comprising:
    an engine case structure extending around an engine central longitudinal axis;
    a shroud assembly attached to the engine case structure;
    a multiple of supported air seal segments attached to the shroud assembly; and
    a multiple of floating air seal segments circumferentially alternated with the multiple of supported air seal segments.

12. The gas turbine engine as recited in claim 11, wherein the multiple of supported air seal segments are actively actuated.

13. The gas turbine engine as recited in claim 11, wherein each of the multiple of floating air seal segments includes a first stepped surface with a first contact surface, and a second stepped surface with a second contact surface.

14. The gas turbine engine as recited in claim 13, wherein the first contact surface and the second contact surface each include a semi-cylindrical member.

15. The gas turbine engine as recited in claim 14, wherein the first contact surface and the second contact surface are axially arranged with respect to the engine central longitudinal axis.

16. A method for blade tip clearance control of a gas turbine engine, comprising:
    circumferentially alternating a multiple of floating air seal segments with a multiple of supported air seal segments.

17. The method as recited in claim 16, further comprising:
    supporting the multiple of supported air seal segments with respect to a shroud assembly.

18. The method as recited in claim 17, further comprising:
    constraining the multiple of floating air seal segments with respect to the shroud assembly.

* * * * *